(12) United States Patent
Sarkar et al.

(10) Patent No.: US 10,176,435 B1
(45) Date of Patent: Jan. 8, 2019

(54) METHOD AND APPARATUS FOR COMBINING TECHNIQUES OF CALCULUS, STATISTICS AND DATA NORMALIZATION IN MACHINE LEARNING FOR ANALYZING LARGE VOLUMES OF DATA

(71) Applicants: Shyam Sundar Sarkar, Fremont, CA (US); Ayush Sarkar, Fremont, CA (US)

(72) Inventors: Shyam Sundar Sarkar, Fremont, CA (US); Ayush Sarkar, Fremont, CA (US)

( * ) Notice: Subject to any disclaimer, the term of this patent is extended or adjusted under 35 U.S.C. 154(b) by 529 days.

(21) Appl. No.: 14/815,987

(22) Filed: Aug. 1, 2015

(51) Int. Cl.
*G06F 17/30* (2006.01)
*G06N 99/00* (2010.01)

(52) U.S. Cl.
CPC .................................. *G06N 99/005* (2013.01)

(58) Field of Classification Search
CPC ...... G06N 99/05; G06N 5/048; G06N 3/0436; G06N 99/005; G06N 7/02; G06N 7/04; G06N 7/023; G06N 3/126; G06N 5/04; G06N 3/008; G06N 5/025; G06N 5/043; G06N 7/005; G06N 99/002; G06N 3/006; G06N 3/0409; G06N 3/049; G06N 3/063; G06N 3/08; G06N 3/086; G06N 5/022; G06N 7/046

USPC .......................................................... 706/25
See application file for complete search history.

(56) References Cited

U.S. PATENT DOCUMENTS

2002/0103793 A1* 8/2002 Koller ............... G06F 17/30469
2016/0358099 A1* 12/2016 Sturlaugson ........... G06N 5/043

* cited by examiner

*Primary Examiner* — Sheree N Brown

(57) ABSTRACT

The advancements of the Internet of Things and the big data analytics systems demand new model for analyzing large volumes of data from a plurality of software systems, machines and embedded sensors used for a plurality of application areas such as natural ecosystems, bioinformatics, smart homes, smart cities, automobiles and airplanes. These complex systems need efficient methods for near real time collection, processing, analysis and sharing of data from and among the plurality of sensors, machines and humans. This invention identifies and proposes implementation of a new model (CALSTATDN) for machine learning over large volumes of data combining methods of calculus (CAL), statistics (STAT) and database normalization (DN) in order to reduce error in learning process and to increase performance by several orders of magnitude. This invention further describes machine learning techniques for storing and processing of high speed real-time streaming data with variations in time, space and other dimensions.

3 Claims, 7 Drawing Sheets

METHOD AND APPARATUS FOR COMBINING TECHNIQUES OF CALCULUS, STATISTICS AND DATA NORMALIZATION IN MACHINE LEARNING FOR ANALYZING LARGE VOLUMES OF DATA

FIELD OF THE INVENTION

Implementations of the present disclosure relate to an analytics system for Internet of Things (IoT), and more particularly, to a big data analytics system to deal with very large volumes of data captured at high velocity.

The Internet of Things (IoT) is the idea of everyday objects informing and being informed about other objects systematically, via connection and exchange of information over the internet. A highly sophisticated, technical structure with the capability of processing a multitude of complex information streams is required for such a system. For successful operations, the IoT system structure or architecture needs: different sensors embedded in all objects that allow them to provide their location and status; connection to the Internet; proper intermediate software systems between these objects; operating platforms and protocols to manage large amounts of data being exchanged, captured, stored and analyzed.

Things, in the Internet of Things, can refer to a wide variety of devices such as heart monitoring implants, bio-chip transponders on farm animals, electric clams in coastal waters, automobiles with built-in sensors, sensors used for smart cities or for airplanes. These devices collect useful data with the help of various existing technologies and then autonomously send the data to other devices or servers.

IoT along with other internet data sources are expected to generate very large amounts of data from diverse locations that should be analyzed and aggregated very quickly, thereby increasing the need for better modeling, storing and analysis of such data using innovative machine learning method.

BACKGROUND OF THE INVENTION

One important category of pertinent techniques proposed in recent literature for efficiently acquiring and managing data from sensors and other internet sources that have received significant attention are the model-based techniques. These techniques use mathematical models for solving various problems pertaining to data acquisition and management. Obtaining values from a sensor requires high amount of energy. Since most sensors are battery-powered, they have limited energy resources. To minimize the number of samples obtained from the sensors, models are used for selecting sensors, such that user queries can be answered with reasonable accuracy using the data acquired from the selected sensors. Another energy-intensive task is to communicate the sensed values to the base station. Several model-based techniques exist for reducing the communication cost and maintaining the accuracy of the sensed values.

Machine Learning plays an important role in a wide range of critical applications with large volumes of data, such as data mining, natural language processing, image recognition, voice recognition and many other intelligent systems. There are some basic common threads about the definition of Machine Learning. Machine Learning is defined as the field of study that gives computers the ability to learn without being explicitly programmed. For example, predicting traffic patterns at a busy intersection, it is possible to run through a machine learning algorithm with data about past traffic patterns. The program can correctly predict future traffic patterns if it learned correctly from past patterns.

There are different ways an algorithm can model a problem based on its interaction with the experience, environment or input data. The machine learning algorithms are categorized so that it helps to think about the roles of the input data and the model preparation process leading to correct selection of the most appropriate category for a problem to get the best result. Known categories are supervised learning, unsupervised learning, semi-supervised learning and reinforcement learning.

(a) In supervised learning category, input data is called training data and has a known label or result. A model is prepared through a training process where it is required to make predictions and is corrected when those predictions are wrong. The training process continues until the model achieves a desired level of accuracy on the training data. Example problems are classification and regression.

(b) In unsupervised learning category, input data is not labelled and does not have a known result. A model is prepared by deducing structures present in the input data. Example problems are association rule learning and clustering. An example algorithm is k-means clustering.

(c) Semi-supervised learning falls between unsupervised learning (without any labeled training data) and supervised learning (with completely labeled training data). Researchers found that unlabeled data, when used in conjunction with a small amount of labeled data may produce considerable improvement in learning accuracy.

(d) Reinforcement learning is another category which differs from standard supervised learning in that correct input/output pairs are never presented. Further, there is a focus on on-line performance, which involves finding a balance between exploration for new knowledge and exploitation of current knowledge already discovered.

Machine learning and statistics are closely related. The ideas of machine learning have roots in statistics starting from theoretical understandings down to the methods of implementations. Some researchers have already adopted methods called statistical learning to correctly represent machine learning.

Certain machine learning techniques are widely used and are as follows: (1) Decision tree learning, (2) Association rule learning, (3) Artificial neural networks, (4) Inductive logic programming, (5) Support vector machines, (6) Clustering, (7) Bayesian networks, (8) Reinforcement learning, (9) Representation learning, and (10) Genetic algorithms.

The learning processes in machine learning algorithms are generalizations from past experiences. After having experienced a learning data set, the generalization process is the ability of a machine learning algorithm to accurately execute on new examples and tasks. The learner needs to build a general model about a problem space enabling a machine learning algorithm to produce sufficiently accurate predictions in future cases. The training examples come from some generally unknown probability distribution.

In theoretical computer science, computational learning theory performs computational analysis of machine learning algorithms and their performance. The training data set is limited in size and may not capture all forms of distributions in future data sets. The performance is represented by probabilistic bounds. Errors in generalization are quantified by bias-variance decompositions. The time complexity and feasibility of learning in computational learning theory describes a computation to be feasible if it is done in polynomial time. Positive results are determined and classified when a certain class of functions can be learned in polynomial time whereas negative results are determined and classified when learning cannot be done in polynomial time.

PAC (Probably Approximately Correct) learning is a framework for mathematical analysis of machine learning theory. The basic idea of PAC learning is that a really bad hypothesis can be easy to identify. A bad hypothesis will err on one of the training examples with high probability. A consistent hypothesis will be probably approximately correct. If there are more training examples, then the probability of "approximately correct" becomes much higher. The theory investigates questions about (a) sample complexity: how many training examples are needed to learn a successful hypothesis, (b) computational complexity: how much computational effort is needed to learn a successful hypothesis, and finally (c) bounds for mistakes: how many training examples will the learner misclassify before converging to a successful hypothesis.

Mathematically, let (1) X be the set of all possible examples, (2) D be the probability distribution over X from which observed instances are drawn, (3) C be the set of all possible concepts c, where c: X→{0.1}, and (4) H be the set of possible hypothesis considered by a learner, H⊆C. The true error of hypothesis h, with respect to the target concept c and observation distribution D is the probability P that h will misclassify an instance drawn according to D:

$$error_D = P_{x \in D}[c(x) \neq h(x)]$$

The error should be zero in the ideal case. A concept class C is "PAC learnable" by a hypothesis class H if and only if there exists a learning algorithm L such that given any target concept c in C, any target distribution D over the possible examples X, and any pair of real numbers $0<\varepsilon, \delta<1$, L takes as input a training set of m examples drawn according to D, where the size of m is bounded above by a polynomial in $1/\varepsilon$ and $1/\delta$ and outputs an hypothesis h in H about which it is true with confidence (probability over all possible choices of the training set) greater than $1-\delta$, then the error of the hypothesis is less than $\varepsilon$.

$$error_D = P_{x \in D}[c(x) \neq h(x)] \leq \varepsilon$$

A hypothesis is consistent with the training data if it returns the correct classification for every example presented it. A consistent learner returns only hypotheses that are consistent with the training data. Given a consistent learner, the number of examples sufficient to assure that any hypothesis will be probably (with probability $(1-\delta)$) approximately (within error $\varepsilon$) correct is $$m \geq \frac{1}{\varepsilon}\left(\ln|H| + \ln\left(\frac{1}{\delta}\right)\right).$$

Calculus is an important branch of mathematics not considered so far as one of the building blocks of machine learning techniques. Calculus is used in every branch of physical science, actuarial science, computer science, statistics, engineering, economics, business, medicine, demography, meteorology, epidemiology and in other fields wherever there is a need to mathematically model a problem to derive an optimal solution. It allows one to go from (non-constant) rates of change to the total change or vice versa. A mathematical model represented in calculus for a large data set can very well represent a hypothesis with very low error ($\varepsilon$) in machine learning. A complex hypothesis is possible to be constructed with one or more part(s) being represented in calculus based model(s). This way of building complex hypothesis for machine learning can lead to powerful techniques for probably approximately correct (PAC) learning with very low error bounds for hypothesis.

The fundamental theorem of calculus states that differentiation and integration are inverse operations. More precisely, it relates the values of anti-derivatives to definite integrals. Because it is usually easier to compute an anti-derivative than to apply the definition of a definite integral, the fundamental theorem of calculus provides a practical way of computing definite integrals. It can also be interpreted as a precise statement of the fact that differentiation is the inverse of integration. In machine learning, if a hypothesis involves model(s) represented in calculus then there must be complementing processes of differentiation and integration involved in the overall learning processes.

Calculus based mathematical models can be used as part of a hypothesis for machine learning over a wide variety of data sets derived from devices such as heart monitoring implants, biochip transponders on farm animals, electric clams in coastal waters, automobiles with built-in sensors, smart homes, smart cities or airplanes with sensors. These devices or sensors used inside physical, biological or environmental systems collect large volumes of data that follows mathematical models based on both calculus and statistics. Efficient machine learning algorithms for such data sets can use hypothesis based on mathematical models involving both calculus and statistics.

When calculus based computational model is used as part of hypothesis in machine learning, the bounds for error and computational complexity are reduced by many orders of magnitude in "PAC learnable" classes of problems.

One important example domain of application for such machine learning algorithms is Smart Home where data is collected from sensors for analysis and automation. Smart Home automation applications control temperature, humidity, light and many other things automatically for homes with sensors. The heat equation is a parabolic partial differential equation that describes the distribution of heat (or variation in temperature) in a given region over time. Heat equation can be the starting point to characterize the temperature rise and fall at various locations in a Smart Home. In calculus, temperature is a function u(x,y,z,t) of three spatial variables (x,y,z) and the time variable t. The heat equation for temperature is represented as a combination over derivatives and partial derivatives in calculus:

$$\frac{du}{dt} = \alpha\left[\frac{d^2u}{dx^2} + \frac{d^2u}{dy^2} + \frac{d^2u}{dz^2}\right],$$

Where u(x,y,z,t) is temperature function and $\alpha$ is a constant of proportionality.

An example statistical machine learning algorithm for analyzing sensor data sets collected from Smart Homes is K-means clustering. The K-means clustering is a method popular for cluster analysis in statistical machine learning. This statistical technique can be efficiently used for Smart Home applications to partition sensor data based on location, time or any other dimension. The k-means clustering aims to partition n observations into k clusters in which each observation belongs to the cluster with the nearest mean, serving as a prototype of the cluster. Given a set of observations $(x_1, x_2, \ldots, x_n)$, where each observation is a d-dimensional real vector, k-means clustering aims to partition the n observations into k($\leq$n) sets $S=\{S_1, S_2, \ldots, S_k\}$ so as to minimize the within-cluster sum of squares (WCSS).

Its objective is to find $$\underset{s}{\operatorname{argmin}} \sum_{i=1}^{k} \sum_{x \in s_i} \|x - \mu_i\|^2$$

Where $\mu_i$ is the mean of points in $s_i$.

K-means clustering algorithm uses an iterative refinement technique. Starting with an initial set of k mean values, $m_1^{(1)}, \ldots, m_k^{(1)}$ the algorithm proceeds by alternating between two steps:

(1) Assignment step: Assign each observation to the cluster whose mean yields the least within-cluster sum of squares (WCSS). Since the sum of squares is the squared Euclidean distance, this is intuitively the "nearest" mean. In mathematics, this means partitioning the observations according to a Voronoi diagram generated by the means where a Voronoi diagram is a partitioning of a plane into regions based on distance to points in a specific subset of the plane.

$$S_i^{(t)} = \{x_p : \|x_p - m_i^{(t)}\|^2 \leq \|x_p - m_j^{(t)}\|^2 \, \forall j, 1 \leq j \leq k\},$$

Where each $x_p$ is assigned to exactly one $S_i^{(t)}$, even if it could be assigned to two or more of them.

(2) Update step: Calculate the new means to be the centroids of the observations in the new clusters.

$$m_i^{(t+1)} = \frac{1}{|S_i^{(t)}|} \sum_{x_j \in S_i^{(t)}} x_j$$

Since the arithmetic mean is a least-squares estimator, this also minimizes the within-cluster sum of squares (WCSS) objective.

The algorithm converges when the assignments no longer change. Since both steps optimize the WCSS objective, and there only exists a finite number of such partitioning, the algorithm must converge to a (local) optimum. There is no guarantee that the global optimum is found using this algorithm.

The algorithm is often presented as assigning objects to the nearest cluster by distance. The standard algorithm aims at minimizing the WCSS objective, and thus assigns by "least sum of squares", which is exactly equivalent to assigning by the smallest Euclidean distance. Using a different distance function other than (squared) Euclidean distance may stop the algorithm from converging.

Computational complexity of K-means clustering algorithm is non-polynomial in nature. If the number of clusters k and d (the dimension) are fixed, the problem can be exactly solved in time complexity represented by the expression $O(n^{dk+1} \log n)$, where n is the number of entities to be clustered. For large number of sensor data records n with d attributes in each record, the time taken to compute k clusters will be very large if k or d or both are large quantities. The time complexity can be reduced if data sets can be normalized and partitioned for parallel executions of K-means clustering algorithm.

Database normalization is the process of organizing the fields and tables of a record oriented relational database to minimize redundancy. Normalization usually involves dividing large tables into smaller (and less redundant) tables and defining relationships between them. The objective is to isolate data so that additions, deletions, and modifications of a field can be made in just one table and then propagated through the rest of the database using the defined relationships. De-normalization is also used to improve performance. De-normalization may also be used when no changes are to be made to the data and a swift response is crucial.

The present invention is fundamentally different from current practices by the application of iterative process of machine learning and normalization on data sets to reduce redundancy and to increase performance by querying normalized data tables. Data normalizations are done after successive steps of computations based on calculus and statistics respectively. This invention uniquely addresses the needs for industrially viable machine learning technology and analytical systems for extremely large data sets from sensors and other internet data sources by combining techniques of both calculus and statistics based mathematical models along with parallel computations on query results from normalized data sets in relational databases to reduce error and to improve performance by many orders of magnitude.

BRIEF SUMMARY OF THE INVENTION

Various embodiments of a new method for machine learning are disclosed. This invention deals with exemplary machine learning method using mathematical models based on both calculus and statistics, for extremely large data sets collected from sensors and various other sources over the internet. The innovation includes a novel machine learning method with multiple levels of computations and iterations in the form of a workflow. The characteristics at a specific level of iterative computing are sequential applications of calculus and statistics based computational steps followed by a step of data normalization and data partitioning. Data normalization and data partitioning enable effective use of parallel executions in next iterations to increase overall performance of machine learning by several orders of magnitude compared to conventional machine learning methods. The exemplary technique, which is suitable for design and analysis of a workflow over iterative computing stages, allows incremental optimizations and design changes. The exemplary workflow system further allows such a machine learning technique to be configured and executed as a single module sharing a central hypothesis for machine learning with plurality of smaller modules of computational stages. This kind of unique modular design leads to an expandable, reusable and maintainable system of machine learning system enhancing performance, reducing error and increasing efficiency of the overall system thereof.

In one example, innovative method of machine learning includes plurality of computational stages with iterations for analyzing sensor data collected from a Smart Home system. A computational stage in this example consists of a calculus based mathematical model popularly known as Heat Equation to characterize the temperature rise and fall at various locations in a Smart Home, followed by a statistics based cluster computing model known as K-means clustering, followed by data normalization method to create or update normalized tables in a database for querying and data partitioning necessary for parallel computing in next iterations in order to improve performance. A plurality of computational stages with iterations in a workflow described in various embodiments is set forth in the accompanying drawings and descriptions.

BRIEF DESCRIPTION OF THE DRAWINGS

The invention will be better understood by reference to the accompanying drawing in which.

DESCRIPTION OF THE PREFERRED EMBODIMENTS

This description, which references the above-identified figures, narrates one or more specific embodiments of one or more inventions. These embodiments, offered only to exemplify various inventions, are shown and described in sufficient details to enable those skilled in the art to understand these inventions. Thus, where appropriate to focus deeply on the invention, the description may omit certain information already known to those of skill in the art.

Figure 1:
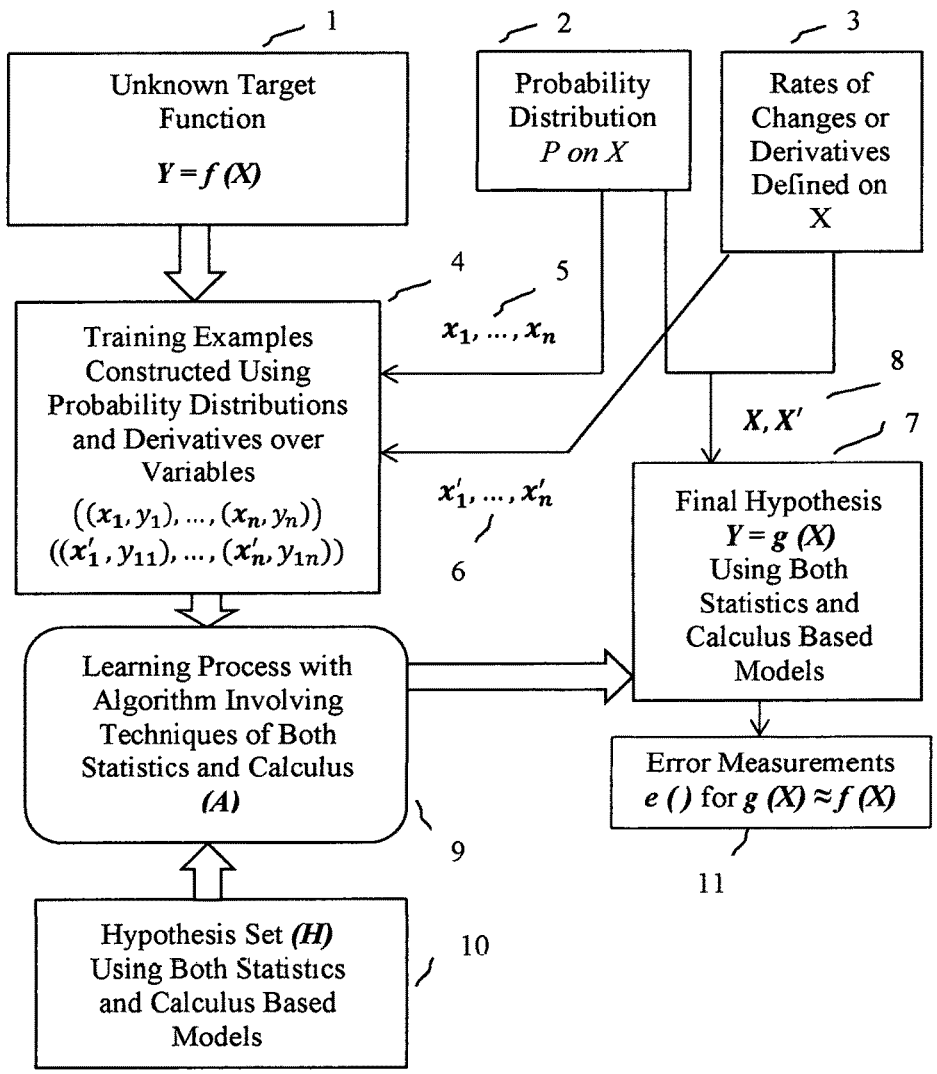
FIG. 1 is the logical flow diagram for a machine learning method involving both calculus and statistics based mathematical models, according to some embodiments.

This invention in a preferred embodiment includes a machine learning method with unique mathematical model based on both techniques of calculus and statistics. FIG. 1 is a conceptual flow diagram illustrating unique conceptual model for machine learning method, in accordance with one or more aspects of the present disclosure. An unknown target function f (X) is shown in block 1 at the start of machine learning method in this invention. At block 2, some samples are created from probability distribution P on data values X for training purposes. These training sets are depicted at 5 in the diagram as input to block 4 of the flow diagram. Derivatives or rates of changes of values in X are computed at block 3 in the diagram and training sets depicted at 6 are also input to block 4 of the flow diagram. The training sets at block 4 are used to train a model for final hypothesis in order to find an approximation of the function f.

A set of hypotheses H is considered at block 10 in the flow diagram. The best hypothesis g in set H must fit the training samples very well. According to this invention, if the set H is chosen carefully to involve models from both calculus and statistics then the approximation will be very close to the true unknown function f provided there are enough training data sets. At block 9 of the flow diagram, the best hypothesis g in set H is derived by using large numbers of training data sets from block 4.

Different machine learning methods have different hypothesis sets H, different ways of finding the best hypothesis g and there are different ways of judging how close g(x) is to f(x) for new examples x. With inputs from blocks 2 and 3, the best hypothesis g(x) in this invention at block 7 uniquely applies both calculus and statistics based models with high levels of correctness leading to very small error estimated at block 11. The exemplary machine learning method described in this invention exploits the powerful ideas of rates of changes, differentiation and integration in calculus along with ideas of powerful generalizations over sets of values in statistical models to derive the best hypothesis g(x) to explain the behavior of any function f(x) with fewer data points and with few generalization over unseen data points compared to conventional machine learning methods.

Figure 2:
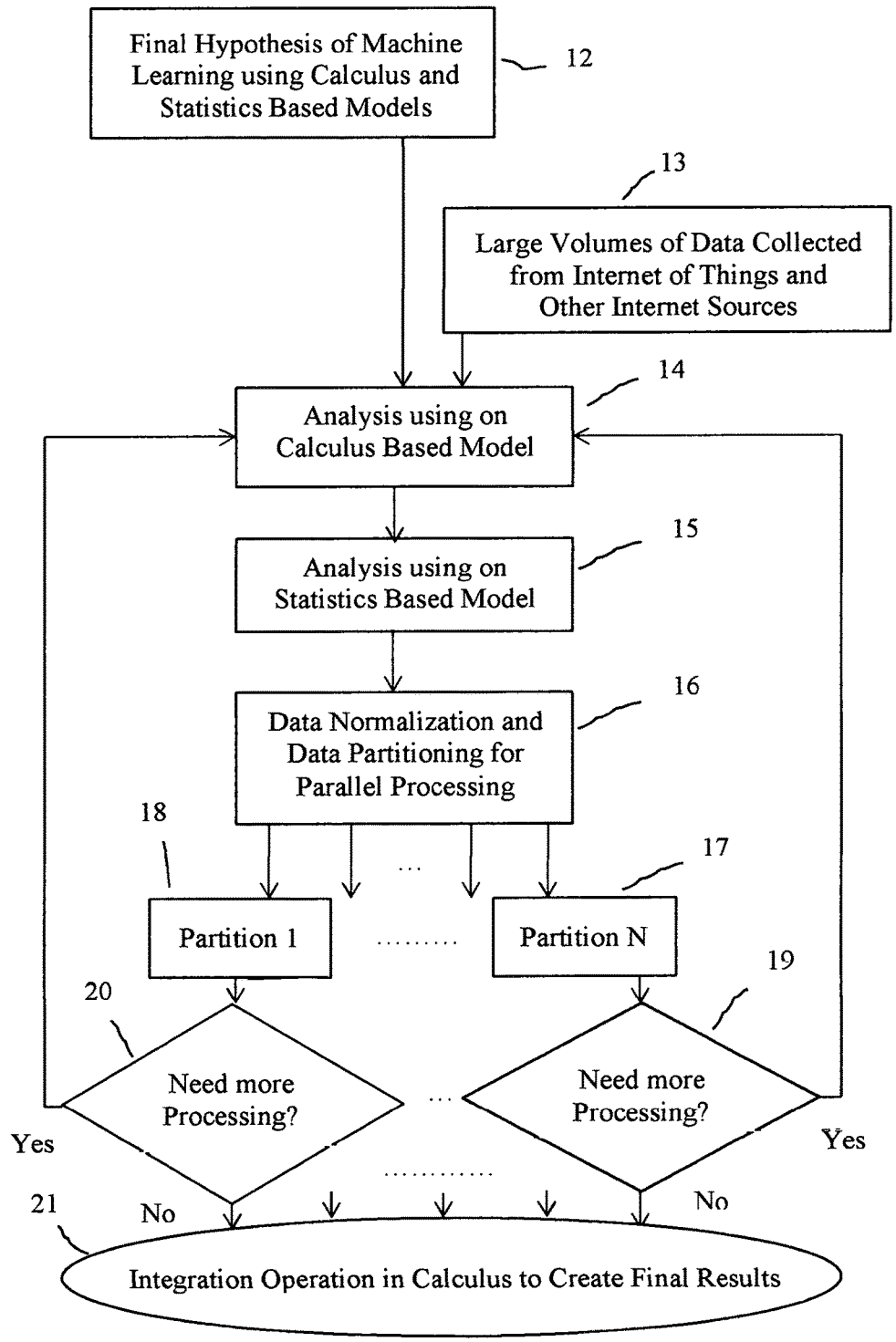
FIG. 2 is the flow diagram of implementation stages for machine learning method in FIG. 1, according to some embodiments.

Aspects of the present invention provide multiple levels of implementations for the final hypothesis on new examples of extremely large data sets. FIG. 2 is a flow diagram showing the implementation with iterative stages of final machine learning hypothesis described in FIG. 1. At block 12, the best hypothesis derived in FIG. 1 is applied to large volumes of data supplied from block 13, collected from Internet of Things (IOTs) and other Internet sources. At block 14 in the flow diagram, analysis based on models in calculus such as finding rates of changes and performing differentiation operations to find first, second or higher derivatives are performed on data sets. Next at block 15 in flow diagram, analysis based on statistics such as clustering, regression or other generalization techniques are performed on data sets. This stage finds generalized values to characterize sets or subsets of values from the data set received from block 14. These generalized values are used as key values inside tables in a normalized database. The normalization over data tables are performed at block 16 using keys and values in data sets derived from block 15.

In this exemplary invention generalized values based on statistics found at block 15 after computing first, second or higher derivative values at block 14, are used as primary keys in normalized database tables at block 16. This enables unique possibilities for queries based on structured query language, into a set of normalized relational database tables to perform join, select, project along with other relational operations with predicate expressions in order to fetch set of records and values for further narrowed down machine learning process and analysis. In this exemplary method, the scope of machine learning is narrowed down greatly resulting in much better performance and improved correctness compared to other conventional machine learning methods.

FIG. 2 further illustrates partitioning of data sets based on queries into normalized data tables at block 16. Data partitions based on partitioning over primary keys are illustrated at block 17, 18 and other similar blocks. These partitions are used for parallel executions at the next level of machine learning. At blocks 19, 20, . . . , there are condition checks whether more processing is needed or not. If more processing is needed with answer "Yes", the next stage of processing goes back to block 14 for iterations. If no more processing is necessary with answer "No", the next processing stage goes to block 21 for integration operations in calculus along with other operations to generate results of analysis in the form of graphs and charts. The integration operation at block 21 is necessary as an inverse operation over derivatives computed at earlier stages in this method. In this exemplary machine learning method, parallel executions at several iterative stages improve overall performance by several orders of magnitudes.

The flow diagram of FIG. 2 demonstrates unique iterative stages over calculus based operations; statistics based operations and database normalizations for querying and retrieving data partitions leading to next iterations with parallel computations. These iterative stages are applied to analyze extremely large data sets with much more improvements in performance and much higher levels of correctness for machine learning.

Figure 3:
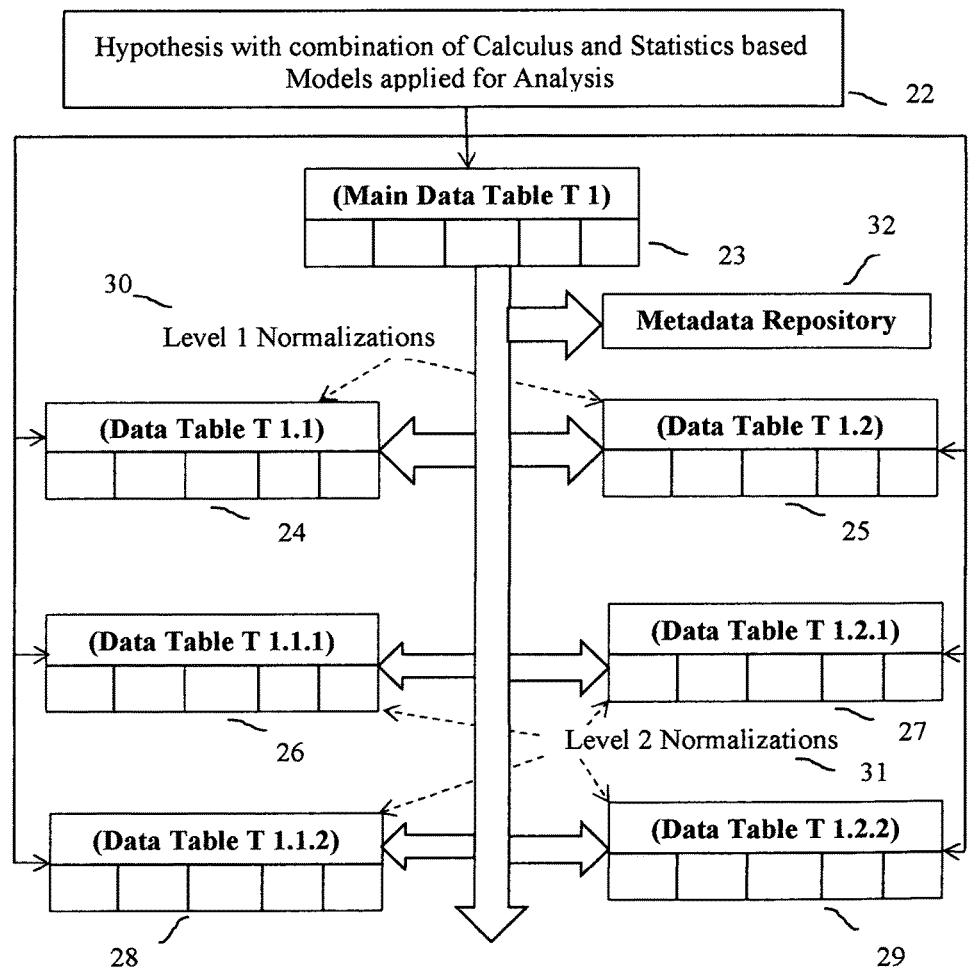
FIG. 3 is implementation of machine learning method in FIG. 2 with data normalization, according to some embodiments.

In another preferred embodiment database normalization process in this exemplary machine learning method is further illustrated in FIG. 3. The block diagram in FIG. 3 illustrates sets of tables in a normalized relational database. The hypothesis with iterative stages described in FIG. 2, is shown at block 22. At block 23, the main table with all data records collected from Internet sources is shown. The hypothesis at block 22 is applied to main table of data at block 23 to find derivatives over values of an attribute with respect to values of another attribute or derivatives over values of a set of attributes with respect to values of another set of attributes respectively in the table T1, following computing models in calculus. The result will be a set of n-tuple of values where n can be 1, 2, 3 or higher numbers. Immediately after finding n-tuple of values for derivatives, a set of generalized values are computed from such n-tuples following some model in statistics. Following this computing step of statistics, unique integer keys are generated and assigned to such generalized n-tuple of generalized values creating key-value pairs as records. These keys in key-value pairs become primary keys in FIG. 3 after Level 1 Normalization at 30. The data table T1.1 at block 24 is a normalized table with these integer keys as its primary keys. The other normalized table after Level 1 Normalization is the data table T1.2 at 25, having foreign keys borrowed from primary keys of table T1.1.

The hypothesis at block 22 can be iteratively applied if necessary to query results of a join operation with conditions over the two tables T1.1 and T1.2 after Level 1 Normalization. This iterative application of hypothesis can lead to Level 2 Normalization at 31 of FIG. 3. Example normalized tables T1.1.1, T1.2.1, T1.1.2 and T1.2.2 are created after Level 2 of Normalization with additional primary keys and foreign keys. Levels of normalization increase with the number of iterations for the application of the hypothesis creating more and more normalized tables in the database. As the normalization happens at various levels of iterations, information about tables, attributes, primary keys, foreign keys, relationships along with mathematical models used from calculus and statistics in the hypothesis are all stored in a Metadata Repository illustrated at block 32 in FIG. 3.

This exemplary machine learning method allows Structured Query Language (SQL) based queries against the normalized relational database illustrated in FIG. 3. Such SQL queries uniquely allow users to specify joins and conditions over normalized tables to fetch records and values to apply machine learning and analysis with specific narrowed down focus. SQL queries also allow partitioning of data sets for parallel executions in the nest iterations for machine learning hypothesis.

While the embodiments are described with reference to various implementations and exploitations, it will be understood that these embodiments are illustrative and that the scope of the inventive subject matter is not limited to them. In general, techniques for using exemplary machine learning method in this invention using models in calculus and statistics as described herein may be implemented with facilities consistent with any hardware and software systems for capturing extremely large volumes of data from Internet of Things and other Internet sources for analysis with improved performance and correctness. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

Embodiments may take the form of an entirely hardware embodiment, an entirely software embodiment or an embodiment combining sensors, internet, software and hardware aspects in a sensor based Smart Home system that may all generally be referred to herein as a "sensor data analytics system" for Internet of Things (IoTs). The described embodiments may be provided as a machine learning algorithm, or database system, or internet based sensor networks, that may include a machine-readable medium having stored thereon instructions, which may be used to program a computer system (or other electronic device(s) such as sensors) to perform a process according to embodiments, whether presently described or not, since every conceivable variation is not enumerated herein.

In a preferred embodiment, an example sensor data analytics system using exemplary machine learning method in this invention is described for Smart Homes. Normalized Database tables illustrated in FIG. 3 for unique machine learning method is used and further extended for a sensor data analytics system with query results from normalized database tables stored into new database tables in a block diagram of FIG. 4A. In a Smart Home system sensors are placed at various locations, various objects and various machines for monitoring and data gathering. Each sensor is associated with unique sensor identity number and three unique dimensions representing three co-ordinates of location, namely x-location, y-location and z-location in a three dimensional space. Sensors collect and transmit data records with unique date and time associated with each data record. In general each record transmitted by a sensor is associated with a unique sensor identity number along with unique date and time of transmission.

The example sensor data analytics system in this invention focuses on a set of sensors arranged at various locations at the ceiling inside a Smart Home system. Such an example system and method can be seamlessly extended to a more complex sensor data analytics system for a complete Smart Home system where structures and functionality presented as a single component or object may be implemented as separate components. These and other variations for any other systems such as Smart Cities systems, Smart Factories systems, Smart Car systems, modifications, additions, and other improvements fall within the scope of the inventive subject matter.

The example sensor data analytics system with sensors installed at the ceiling is a simplification to consider only x-location and y-location to determine the co-ordinates of sensor locations because z-location is same for all sensors at the ceiling of a room. This simplifies the variations or rate of change computations in calculus based models followed by statistics based generalization models. Sensor locations as pairs of x-location and y-location is illustrated at 101 in FIG. 4A. Each sensor has an identifier as unique integer value. This identifier is placed as the value of an attribute with name "moteid" in a transmitted record and in a location descriptor.

As the very first step in sensor data analytics system, there is no rate of change computation or differentiation operation to apply at 101. Statistics based model to find sensor clusters over spatial co-ordinates is applied as next step. At 100, sensor cluster computing using K-means clustering statistical machine learning algorithm is used to compute generalized values of clusterid to identify a specific cluster in a set of clusters. The result of this step is a set of records stored in a table at 103 with attributes (moteid, clusterid, x-location, y-location) where (moteid, clusterid) is the primary key of the table. At 104, one big table is illustrated with all streaming data record values transmitted from sensors. The attributes of this table at 104 are (s_date, s_time, epoch, moteid, clusterid, temperature) where s_date represents date of transmission, s_time represents time of transmission, epoch represents a monotonically increasing number of received records, moteid represents sensor identifier, temperature represents observed temperature and clusterid is an addition to the set of attributes to identify a cluster based on spatial co-ordinates. The primary key (moteid, clusterid) of table at 103 is inherited as foreign key (moteid, clusterid) in the table at 104. These two tables represent normalized tables after Level 1 Normalization in the iterative steps of machine learning method in this invention.

In the next stage of iterative application of exemplary machine learning method, computations based on calculus are performed on set of records resulting from queries over normalized tables at 103 and 104. At 113, a Structured Query Language (SQL) query based on join with predicates is triggered against the normalized tables illustrated at 103 and 104 to filter out information related to x_location only. The results of the query are stored into a temporary table at 111. In a similar way, at 112 a Structured Query Language (SQL) query based on join with conditions is triggered against the normalized tables illustrated at 103 and 104 to filter out information related to y_location only. The results of the query are stored into a temporary table at 110. Temporary table at 111 has two new attributes dtempdx and d2tempdx2. First and second derivative values of temperature with respect to x co-ordinates or x_location are computed and saved into these attributes. Similarly, temporary table at 110 has two new attributes dtempdy and d2tempdy2 to compute first and second derivative values of temperature with respect to y co-ordinates or y_location and to save into these attributes. As a computing stage based on statistics based model, K-means clustering algorithms on temporal co-ordinates are applied on date and time values in the temporary tables at 111 and 110 to find N clusters at 108. Each cluster is assigned a unique integer identifier clusterid_dt. The results of K-means clustering algorithm are stored into two normalized tables 105 and 107 respectively where these two normalized tables inherit foreign keys (moteid, clusterid) from normalized table at 104. These two normalized tables after Level 2 Normalization contain new primary key attribute clusterid_dt. These tables contain average values over derivatives computed within each date and time cluster.

As a next stage, SQL queries are made against normalized tables at 105 and 107 to retrieve sets of records for another iterative stage of unique machine learning method or for integration operation in calculus for creating graphs and charts with analytical and visualization tool.

Figure 4A:
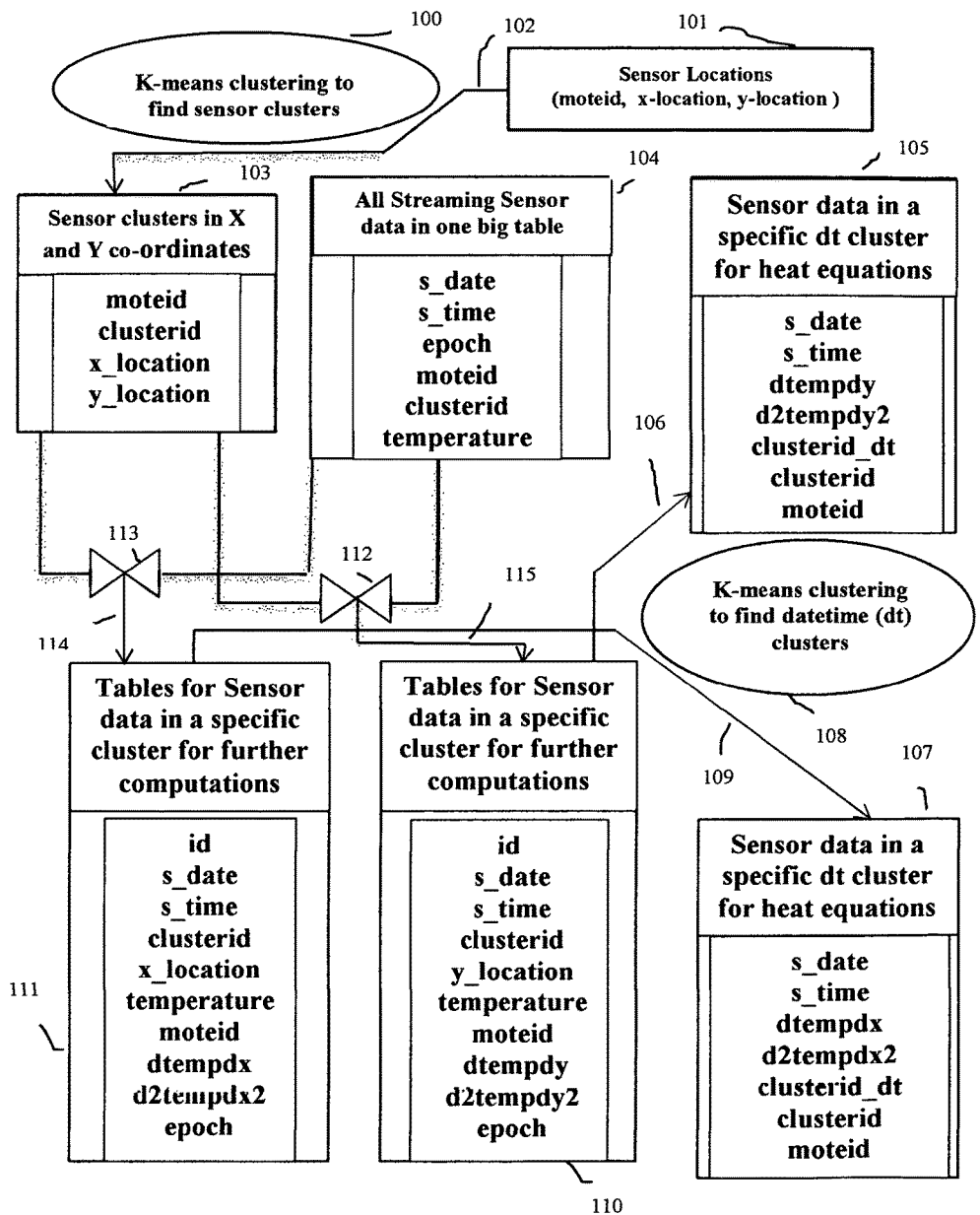
FIG. 4A is the implementation of an example of machine learning method in FIG. 3 with normalized data tables, relationships and attributes, according to some embodiments.
Figure 4B:
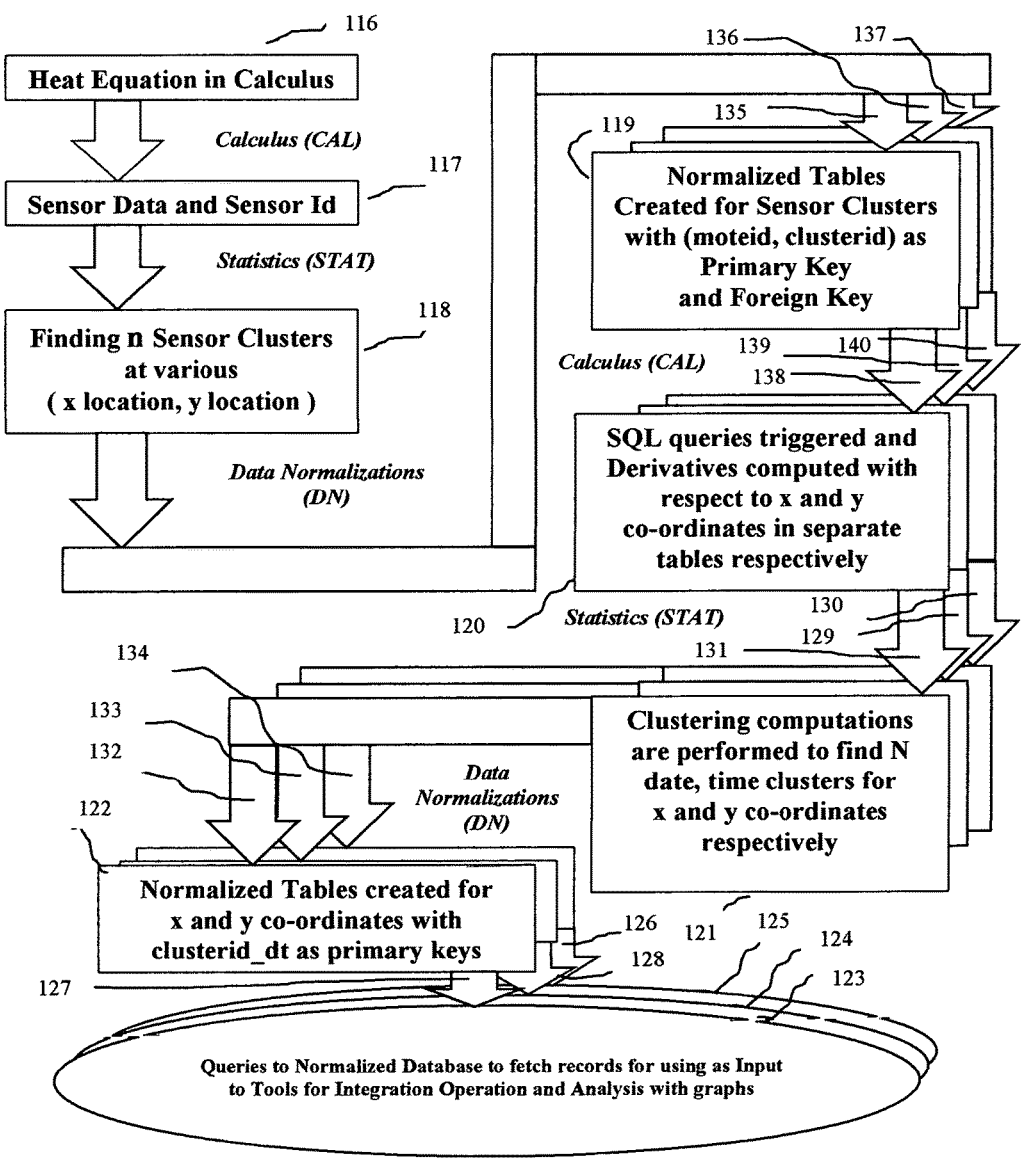
FIG. 4B is flow diagram over execution stages for an example machine learning method in FIG. 4A, according to some embodiments.

FIG. 4B is a flow diagram over different stages and models updating and interacting with normalized database described in block diagram of FIG. 4A. The starting block at 116 in FIG. 4B illustrates heat equation model chosen for sensor data analytics system of a smart home. The heat equation uses calculus to model the rate of change of temperature rise or fall in a three dimensional space having x, y and z co-ordinates. In the example sensor data analytics system, there are only two co-ordinate systems considered, namely x and y co-ordinates for each sensor attached to the ceiling of a room where there is no variation in z co-ordinate. By measuring second derivatives of temperature with respect to x and y co-ordinates from sensor data sets, it is possible to measure first derivative of temperature over time within a specific cluster of sensors inside a Smart Home described in this invention.

At 117, sensor data is collected with unique sensor identifier called moteid. Each sensor is associated with specific x-location and y-location values. At 118, K-means clustering algorithm is applied to find n clusters based on spatial dimensions of sensors represented by x-location and y-location values. Each resulting cluster is assigned a unique integer identifier clusterid chosen from values in the range 0, ..., n−1. Normalized tables are created at 119 with (moteid, clusterid) as primary keys in one table and foreign keys in another table. At 135, 136 and 137, parallel execution paths are shown for updating and accessing normalized database tables. At 138, 139 and 140, parallel execution paths are illustrated for querying with SQL and fetching records from the normalized database tables. At 120, SQL queries are executed in parallel to fetch records based on x-locations and y-locations respectively. These resulting records are stored into separate temporary tables to compute first and second derivatives of temperature with respect to x co-ordinates and y co-ordinates respectively. There are parallel execution paths 129, 130 and 131 from block 120 to block 121. At block 121 K-means clustering algorithm is applied to records fetched from each temporary table created at block 120. The clusters based on temporal dimensions are assigned unique integer identifier clusterid_dt with values in the range 0, ..., N−1.

At block 122, normalized tables are created with primary keys clusterid_dt separately for records with values based on x co-ordinates and y co-ordinates respectively. These normalized tables inherit foreign keys (moteid, clusterid) from normalized tables created earlier. Updates, Inserts and Queries to these normalized tables are done in parallel execution paths illustrated at 132, 133 and 134 from block 121 to block 122. In this example sensor data analytics system, queries can be further triggered over all tables in normalized database to fetch data records for integration operation in calculus at 123, 124 and 125 in parallel execution mode. There are parallel query paths 126, 127 and 128 from block 122 for fetching results of queries. The final graphs and charts for analysis based on heat equation along with other analytical models are done in parallel execution mode at 123, 124 and 125.

FIG. 4B shows iterative stages of "Calculus (CAL)", "Statistics (STAT)" and "Data Normalization (DN)" at various levels in the flow diagram of unique machine learning method. To signify these unique iterative stages, this exemplary method is given the name CALSTATDN in this invention.

Figure 5A:
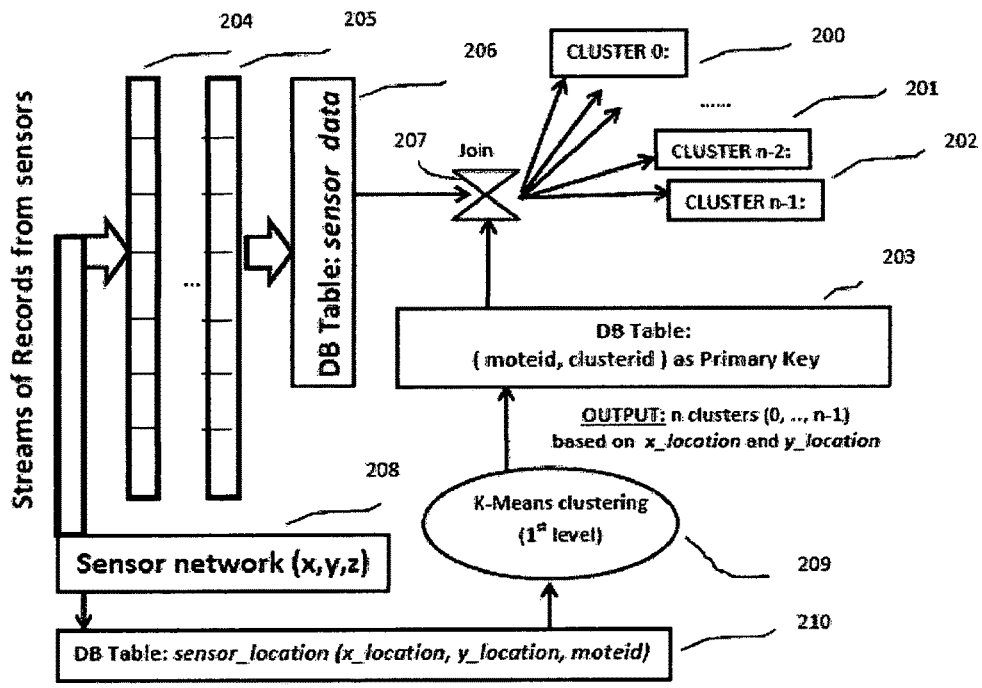
FIG. 5A is a partial data flow diagram starting from sensors to analytical stages for an example machine learning method in FIG. 4B, according to some embodiments.
Figure 5B:
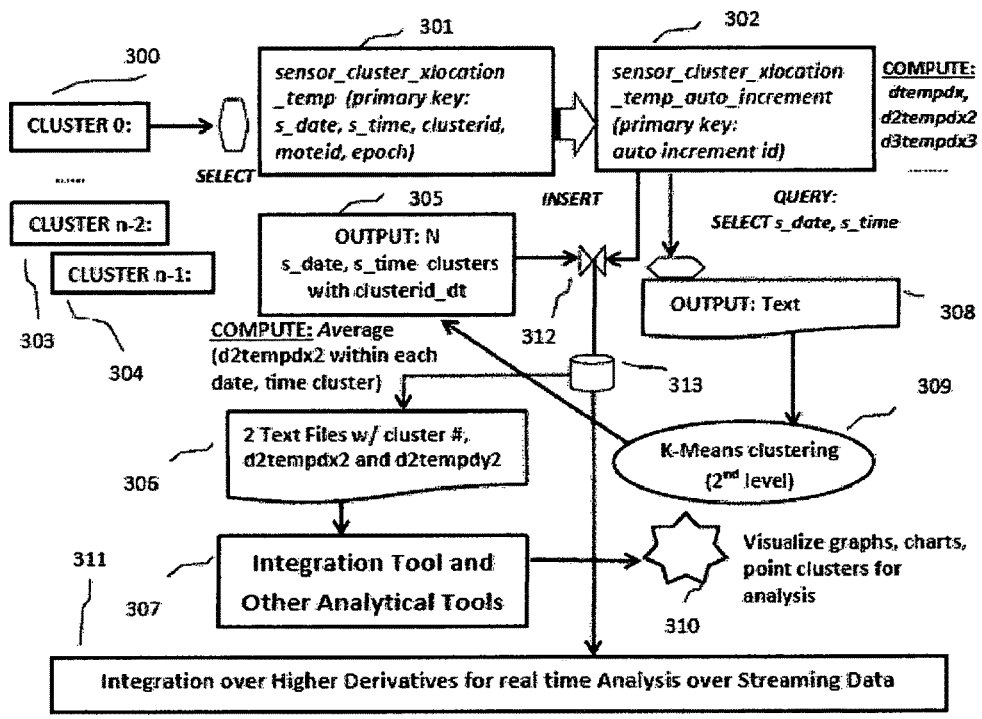
FIG. 5B is a data flow diagram for generating analysis results for an example machine learning method in FIG. 5A, according to some embodiments.

In another embodiment, the exemplary method in this invention analyzes streaming data in unique ways. FIGS. 5A and 5B illustrate flow diagrams over streaming data records generated and analyzed in a sensor data analytics system described in FIGS. 4A and 4B. Streaming data analytics systems demand flexible architectures and designs for networks and databases for continuously streaming data records transmitted and captured at high volume and velocity. In FIG. 5A, sensor network is illustrated at 208 with three spatial co-ordinates x, y and z for each sensor location. As described in other embodiments, sensors considered at the ceiling in a Smart Home system in this invention are associated with only two spatial co-ordinates x and y for all purposes of computing, z co-ordinate being ignored as it is constant for all sensors. At 210, sensor locations and unique sensor identifiers (moteid) are stored in a table in a database with records (x_location, y_location, moteid) for sensors. Sensor network generates and transmits data records in streams illustrated at 204 and 205. These records are transmitted at very high volume and velocity in every second, or every millisecond. These records are captured and stored in Sensor_Data table in a database at 206. This table grows continuously as streaming records are stored continuously. The exact date and time values are attribute values of each record and stored in Sensor_Data table. Date and Time attributes are used as Primary Keys in this table for streaming records.

At 209, K-means clustering algorithm is used to find sensor clusters based on spatial co-ordinates x_locations and y_locations. The output of clustering algorithm is stored into a normalized database table using (moteid, clusterid) as primary keys at 203. This database table size is fixed with number of records as number of sensors in the network. At 207, a date and time windowed join is taken over database tables at 206 and 203. This join is restricted by a window over date and time for records received and stored in the table Sensor_Data. For streaming records stored in table Sensor_Data, date and time window will shift for every join. The results of the join are also streams of records at 200, . . . , 201, 202 with clusterid values in the range of 0, . . . , n−1 specifying clusters of streaming records based on spatial co-ordinates.

FIG. 5B illustrates the incoming streaming records at 300, . . . , 303,304 with specific clusterid values. These records are stored in two continuously incrementing temporary database tables namely sensor_cluster_xlocation_temp and sensor_cluster_ylocation_temp respectively for all common attribute values along with x_location and y_location specific values respectively. The primary keys for these two tables are (s_date, s_time, clusterid, moteid, epoch) where these attributes are defined in FIG. 4A. At 301 in FIG. 5B only one table corresponding to x_location specific values is illustrated. Another table for y_location specific values is not shown. At 302 in FIG. 5B a new table sensor_cluster_xlocation_temp_auto_increment is illustrated as another temporary table for x_location specific values with auto increment primary key values available in popular relational databases. There is another new temporary table not shown in FIG. 5B which is sensor_cluster_ylocation_temp_auto_increment for y_location specific values with auto increment primary key values. These auto increment tables are populated with records from other temporary tables already mentioned. In FIG. 5B, records from sensor_cluster_xlocation_temp at 301 are selected and inserted into sensor_cluster_xlocation_temp_auto_increment at 302. Because primary keys are auto increment keys in the range 1, 2, 3, . . . it is possible to use single simple SQL query to compute first, second or higher derivatives of temperature with respect to date and time combined values followed by updates into corresponding attributes in the table sensor_cluster_xlocation_temp_auto_increment. Similar operations are possible with sensor_cluster_ylocation_temp_auto_increment table not shown in FIG. 5B. These simpler SQL queries to compute first, second or higher derivatives over streaming data records with auto increment primary key integer values are sometimes very complex or impossible without auto increment integer primary key values. This is a unique aspect of this exemplary machine learning method over streaming data.

At block 308 of FIG. 5B, results of select query over the s_date and s_time values within the latest date and time window of streaming records within the table at 302 are fetched and at block 309, K-means clustering on temporal co-ordinates (s_date, s_time) is performed to get N clusters. These records of N clusters are assigned unique key clusterid_dt having values in the range (0, . . . , N−1) and stored into temporary database table at 305. At 312, a join operation between the table at 302 and the table at 305 is taken over equality of s_date and s_time attributes and the results of join is stored in a temporary table in a database at 313. At 312 similar join is also taken between the table at 302 and the table sensor_cluster_ylocation_temp_auto_increment which is not shown in FIG. 5B. The results of these joins are two sets of records corresponding to x_location and y_location based values respectively, clustered by temporal dimension using attributes (s_date, s_time) in a sliding date and time window over streaming records.

From the result sets of these joins, mean values for first, second or higher derivative values are computed in each of N time clusters. Standard deviations are computed to see error limits, tolerance computations and any necessary corrections are performed. Double derivative over temperature with respect to x and y co-ordinates are computed for each of N clusters in the example sensor data analytics system for heat equation at 306 and fed into an integration tool at 307. Heat equation expression is used to find first derivative of temperature with respect to time and integration method like Range-Kutta is applied at 307. The output of integration in the form of graphs and charts are visualized and analyzed at 310.

The results of joins are also transferred from block 313 to block 311 where first, second, third or even higher derivatives are computed and calculus based graph analysis techniques are applied to visualize patterns, clusters or trends.

Variations for differential equations with higher derivatives, integration techniques, various statistical techniques for generalizations such as regression, support vectors, instance based learning, deep learning along with other techniques for any systems such as Smart Cities, Smart Factories, Smart Cars, various modifications, additions, and other improvements fall within the scope of the inventive subject matter described.

What is claimed is:

1. A method for machine learning to analyze extremely large volumes of data captured at high velocity from Internet of Things (IOTs) and other internet sources, said method comprising: computer based processing, memory and storage units, wherein sets of hypothesis using calculus and statistics based computing models, constructing sets of training examples analyzing probability distributions over variables, learning processes over training examples involving models of calculus, statistics and data normalization, final hypothesis incorporating computing models from calculus, statistics and data normalization, wherein error estimation between final hypothesis and unknown target function for training data sets being very low compared to error estimations in conventional machine learning techniques, wherein overall performance and efficiency improving by several orders of magnitude compared to conventional machine learning methods, a) said method further comprising: identification of independent variables and dependent variables in training data sets, wherein values of dependent variables having dependencies on single independent variable or multiple independent variables, wherein computing techniques based on statistics to analyze independent variables and computing techniques based on calculus to find derivatives of dependent variables with respect to independent variables along with performing integration operations over derivatives for analyzing dependent variables, b) said method further comprising: single iteration or multiple iterations over a sequence of four distinct computing stages in the said final hypothesis, (1) the first stage of computing involving differentiations in calculus based model, (2) the second stage of computing involving statistics based model, (3) the third stage of computing involving data normalization along with data partitioning and (4) fourth stage of computing to test conditions for end of iteration, c) said method further comprising: said fourth stage of testing conditions leading to two distinct paths, wherein positive test result allowing for execution of next iteration over said sequence of four computing stages, wherein negative test result leading to fifth stage of computing for integration operations in calculus to create final results of said method with graphs, charts and other visualizations, d) said method further comprising: said third stage of computing with data normalization resulting in plurality of data partitions, wherein said fourth stage testing condition with said positive result for next iteration resulting in parallel executions over plurality of data partitions, e) said method further comprising: said first stage in a said iteration computing zero order (no derivative), first order, second order or higher order derivatives of a dependent variable with respect to an independent variable or multiple independent variables, wherein said second stage applying statistical computing model finding generalized values for said independent variables, wherein said generalized values helping to create primary keys and foreign keys inside normalized relational database tables as part of said third stage of data normalization process, wherein said normalized relational database providing facilities for querying with relational operators along with predicates for fetching sets of data records as data partitions, wherein said parallel executions over said data partitions allowed by positive test results in said fourth stage of computing, f) said method further comprising: each data partition in plurality of data partitions in the current iteration of said four distinct computing stages, wherein generalized values from statistical computing of said second stage over independent variables as primary keys and foreign keys inside normalized database tables in said third stage at a higher level of normalization in said current iteration compared to levels of normalization in relational database as part of said third stages of data normalizing processes, g) said method further comprising: multiple said iterations with parallel executions on plurality of data partitions, wherein creating normalized database tables at multiple levels of normalizations in relational database providing opportunities for complex queries with relational operators and predicates fetching various different data partitions for further processing with narrowed down focus on machine learning for analysis, not available in other conventional machine learning methods, h) said method further comprising: multiple said iterations with said parallel executions on data partitions resulting from queries against normalized relational database in each said iteration bringing down time complexity of machine learning process, improving overall performance by several orders of magnitude compared to conventional machine learning methods, i) said method further comprising: triggering proper queries against normalized relational database in each of said iterations, wherein storing results of queries in memory units and proper storage facilities of computing systems for further analysis with machine learning method, wherein value spaces of data narrowing down for machine learning process increasing correctness and reducing error in overall machine learning method compared to conventional machine learning methods, j) said method further comprising: said four stages of computing in said iterations executing in disparate locations of computers over a common network improving efficiency and performance, wherein calculus based computing stage executing in a specific computing server at a location finding derivatives of one or more dependent variables, wherein statistics based computing stage executing in different computing server at another location applying statistics based techniques on independent variables, wherein data normalization in said third stage and testing of end conditions in said fourth stage, executing in yet another computing server location, wherein all computing servers in a common network going through process of collusions sharing results and data with all computing servers.

2. The method for machine learning to analyze extremely large volumes of data captured at high velocity from Internet of Things (IOTs) and other internet sources of claim 1 realized in concrete and unique implementation as hardware and software in computer based systems with memory, processing and storage units for an application comprising: software, the network and processing system in an exemplary implementation of said unique method for an application known as smart home analytic system, wherein said system comprising of sensors at static locations inside a home for monitoring and controlling temperature, humidity and other attributes inside the home environment, communicating with a central server for storing data records from said sensors in database systems for machine learning and analysis executing said iterative computing model based on calculus, statistics and data normalization of said unique machine learning method, wherein a) said sensors having x, y and z co-ordinates as static location co-ordinates, wherein second derivatives of temperature values from data records are computed with respect to x, y and z co-ordinates respectively of said sensors in order to find first derivative of temperature with respect to time executing Heat Equation for analyzing distribution of heat or variations in temperature in a given region over time, wherein said iterative computing stages based on models of calculus, statistics and data normalization in distinct invention of said machine learning method executing in said application, not present in conventional machine learning techniques for smart home analytics systems, b) attributes in data records representing spatial co-ordinates along with attributes representing temporal co-ordinates identified as independent variables and all other attributes identified as dependent variables, wherein c) derivatives not computed in first stage of computing in said method in first iteration, d) a set of logical clusters over said sensors computed from statistical clustering algorithm over x and y co-ordinates of said sensors in said second stage of computing in first iteration, wherein each logical cluster assigned a unique cluster identifier and a record for each sensor stored in spatial cluster table in a relational database in said second stage of computation in first iteration, e) said sensors at ceiling of home existing at some height from floor, wherein said sensors having same value for z co-ordinates, variation of temperature with respect to z co-ordinates of sensors being zero, wherein x and y co-ordinates of said sensors computing second derivatives of temperature values from data records in said first stage of computing in said method in second iteration, wherein f) said sensors transmitting data, wherein data records within specific date and time window from said sensors being captured and stored in a big table inside said relational database, wherein a join operation of said big table with said spatial cluster table resulting in a big table with spatial clustering, wherein said big table with spatial clustering normalized into two tables for x locations and y locations respectively in said third stage of computing in said method in first iteration, wherein said two big tables for x and y locations having compound primary keys constructed from multiple attributes to have proper ordering over records for computing first and second derivatives of temperature with respect to x and y co-ordinates in said first stage of computing in second iteration, wherein records from said two big tables for x and y co-ordinates inserted into two new big tables with auto increment primary keys, available in a relational database, for further simplification over computing of said derivatives executing queries in structured query language and storing those values in new attributes of said two new big tables, g) a set of logical clusters over said date and time window of captured records resulting from statistical clustering algorithm in said second stage of computing in second iteration applied to date and time attributes as a combined single attribute, wherein each logical cluster assigned a unique integer cluster identifier and records for all clusters stored in a temporal cluster table, wherein results of joins over temporal cluster table and said big tables with auto increment primary keys with values for said derivatives, stored into two new date time cluster big tables for x and y co-ordinates respectively in said third stage of computing in second iteration, wherein mean values along with standard deviations for first and second derivatives for temperature computed for each date time logical cluster and stored in new attributes within said big tables for date time clusters respectively, wherein h) mean values further computed for second derivatives of temperature with respect to x and y co-ordinates respectively for said logical clusters of date time within each logical cluster of spatial co-ordinates of sensors, i) testing of conditions for finding whether all independent variables already analyzed or not in said fourth stage of computing in said method in second iteration, wherein negative test result leading to last stage or said fifth stage of computing in said method, wherein applying Heat Equation over mean values for second derivatives of temperature with respect to x and y co-ordinates respectively for said date time window clusters for each logical cluster over spatial co-ordinates of sensors in an integration tool for finding variation of temperature with respect to time in each spatial cluster of sensors, wherein executing integration methods in calculus for drawing graphs and charts for visualizing rise or fall of temperature over said date time window of data captured, for each said logical cluster of sensors based on spatial co-ordinates, wherein first, second or higher derivative values of temperature along with variations with respect to time visualized in cluster diagrams comparing trends and density distributions at various regions for all sensor clusters over a period of date and time visualizing in said fifth stage of computing of said method of machine learning, wherein j) distinct invention of said method in exemplary implementation as a machine learning technique for said application known as smart home analytic system further comprising: performance and efficiency improving by several orders of magnitude with reductions in errors in machine learning process.

3. The method for machine learning to analyze extremely large volumes of data captured at high velocity from Internet of Things (IOTs) and other internet sources of claim 1 realized in concrete and unique implementation as hardware and software system for another application comprising: a system for data analytics, the network and processing system in an exemplary implementation of distinct invention of said method for said application of facial recognition system using statistical computing of neural network, wherein said system comprising of a two dimensional matrix of data elements for image of a face as input to said system to recognize face of a person, a data element in said matrix representing a single scalar element of a multi-component representation of the smallest addressable element called pixel in an image, the image recognition process involving iterative computing model based on calculus, statistics and data normalization in said method of machine learning improving performance by several orders of magnitude of facial recognition system along with reduction in errors compared to other available neural network based facial recognition systems, wherein a) said application of facial recognition system comprising: said data elements in two dimensional matrix having rows and columns numbered from 0 to maximum integer numbers m and n respectively, wherein location of each data element addressed by a pair of row number and column number, wherein each said data element represented by multiple components of numerical values representing data components for brightness, color along with other things in an image, wherein metadata or definitions for lower level types and attributes for multiple components of numerical values defined and stored in metadata repository for using in the analysis process, wherein b) types and attributes for data elements defined at lower levels being different from types and attributes defined at higher levels representing larger regions like eyes, lips, nose, hair along with many other regions of importance in a face, wherein said higher level attributes defining independent variables and said lower level attributes defining dependent variables of said machine learning method with four stages of computing, wherein neural network based statistical computations performed on independent variables in said second stage of machine learning method and calculus based computations performed on dependent variables by finding derivatives of dependent variables with respect to independent variables in said first stage of machine learning method along with integration operations at the fifth or last stage of said machine learning method, c) identifiers for generalized values for independent variables after neural network based computations defining primary keys and foreign keys in multiple tables in a relational database in said third stage of data normalization, d) said method of machine learning for facial recognition system further comprising: calculus based computing of said first stage of machine learning method executing in separate computing server in a common network, statistics based computing of said second stage of machine learning method executing in another separate server, data normalizations of said third stage along with testing of conditions for next iteration of said fourth stage of machine learning method executing in yet another separate server in a common network, wherein all these servers for all computing stages share results of computations by collusions over the network, wherein executions of different stages of computing in disparate computers in a network improving overall performance by several orders of magnitude compared to other neural network based facial recognition systems currently available, e) said method of machine learning for said application of facial recognition system further comprising: said computing stages in order to recognize said plurality of regions of interest in a face represented as plurality of data partitions and represented by said higher level independent variables, wherein parallel executions taking place in disparate sets of servers in the same common network improving performance further by orders of magnitude, wherein failure to recognize a specific region in a face by one server or a set of servers in common network communicated to all other servers through collusions, triggering end of the whole facial recognition process improving further efficiency of the recognition process not available in existing methods of machine learning.

* * * * *